United States Patent
Grillos, II et al.

(10) Patent No.: US 12,510,018 B1
(45) Date of Patent: Dec. 30, 2025

(54) INTEGRATED RECUPERATOR FOR A CLOSED BRAYTON CYCLE

(71) Applicant: Blue Origin Manufacturing, LLC, Huntsville, AL (US)

(72) Inventors: Emmanuel John Grillos, II, Kent, WA (US); Steven Stanley, Sammamish, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/952,575

(22) Filed: Nov. 19, 2024

(51) Int. Cl.
*F02C 1/06* (2006.01)
*F02C 1/05* (2006.01)
*F02C 1/10* (2006.01)

(52) U.S. Cl.
CPC .................. *F02C 1/06* (2013.01); *F02C 1/05* (2013.01); *F02C 1/10* (2013.01)

(58) Field of Classification Search
CPC ...... F02C 1/05; F02C 1/06; F02C 1/08; F02C 1/10; F02C 1/105; G21D 5/02; G21D 5/04; G21D 5/06; G21D 5/08
See application file for complete search history.

(56) References Cited

U.S. PATENT DOCUMENTS 3,224,199 A * 12/1965 Best ........................ F42B 19/20
  60/497
2002/0073688 A1   6/2002 Bosley et al.
2016/0049210 A1 * 2/2016 Filippone .............. F22B 37/007
  376/406
2017/0234773 A1 * 8/2017 DeMarco .............. G01M 15/02
  73/112.01

OTHER PUBLICATIONS

Lee Mason, "A Summary of Closed Brayton Cycle Development Activities at NASA." NASA Glenn Research Center, Supercritical CO2 Power Cycle Symposium, Apr. 29-30, 2009.
McDonald, CF. "Low Cost Recuperator Concept for Microturbine Applications." Proceedings of the ASME Turbo Expo 2000, Munich, Germany. May 8-11, 2000.

\* cited by examiner

*Primary Examiner* — Scott J Walthour
(74) *Attorney, Agent, or Firm* — Summit Patents, PC

(57) ABSTRACT

A closed Brayton cycle (CBC) system for an external heat source is presented. The CBC system includes a turbine that receives a hot gas from a heat source and a compressor that receives cooler gas that is returned to the heat source. The turbine and the compressor may be on a common shaft. A recuperator, which may be integrated with the turbine and the compressor, exchanges waste heat from the turbine exhaust to the compressor exit flow to increase the efficiency of the system. Instead of manifolding the inlets and outlets of the turbine and compressor and sending the gasses to the recuperator via the manifolds or other channeling, the recuperator may be integrated into the system between a turbine system and the compressor, both of which are contiguous (e.g., directly connected) with the recuperator. Such a configuration may allow for increasing efficiency and reducing the mass of the system.

18 Claims, 4 Drawing Sheets

INTEGRATED RECUPERATOR FOR A CLOSED BRAYTON CYCLE

BACKGROUND

The Brayton cycle is a thermodynamic cycle that describes the operation of certain heat engines that have air or some other gas as their working fluid. In a closed Brayton cycle, wherein the working gas stays inside the system, heat may be introduced into the system with a heat exchanger or other type of heat source.

The closed Brayton cycle is an energy conversion system that provides a number of advantages for use in space applications. For example, the closed Brayton cycle does not need an atmosphere (e.g., air) to operate, and it has the potential to generate a large amount of power relative to its weight and size. These are important considerations for space flight and may also be important for Earth-bound applications. Even with its advantages, however, demand continues for a reliable energy conversion system that has relatively low mass, size, and energy efficiency, while being operable in the confines and limited resources involved in space flight or other space missions.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
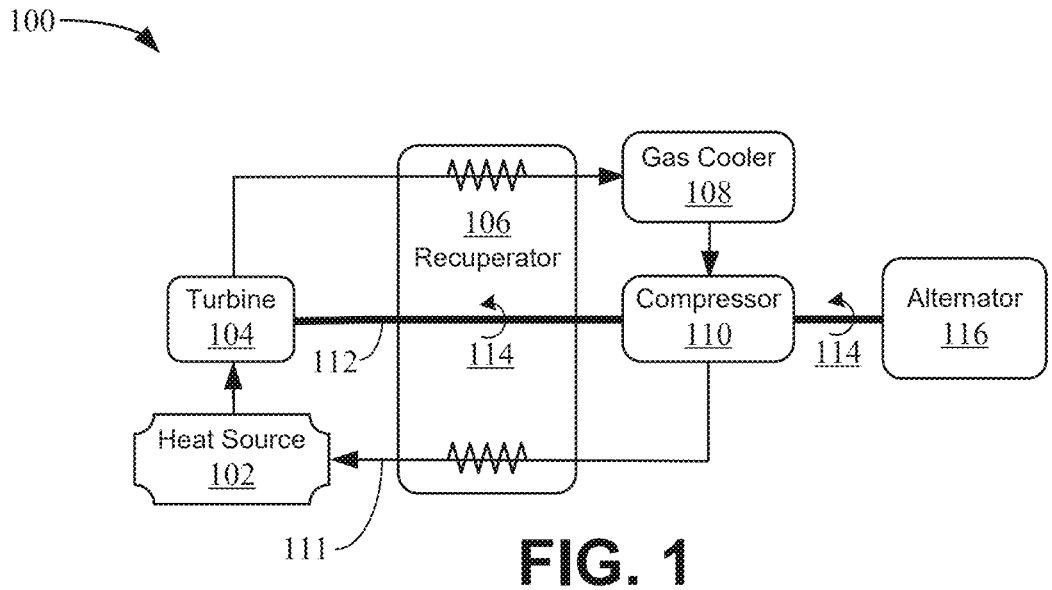
FIG. 1 is a flow diagram of a closed loop Brayton cycle system, according to some embodiments.

This disclosure describes a closed Brayton cycle (CBC) system that includes both a turbine that receives a hot gas from a heat source and a compressor that receives cooler gas that is returned to the heat source. The turbine and the compressor may be on a common shaft. A recuperator, which may be integrated with the turbine and the compressor, exchanges waste heat from the turbine exhaust to the compressor exit flow so as to increase the efficiency of the system.

Generally, CBC systems are designed with the use of inlets and outlets that are manifolded (e.g., via channeling or tubing) to and from a physically separate recuperator. These systems, due at least in part to the presence of the manifolding, may have relatively high mass and complexity. In contrast, in various embodiments described herein, instead of manifolding the inlets and outlets of the turbine and compressor and sending the gasses to the recuperator via the manifolds or other channeling, the recuperator may be integrated into the system between a turbine system and the compressor, both of which are contiguous (e.g., directly connected) with the recuperator. Such a configuration may allow for increasing the efficiency and reducing the mass of the system.

In some embodiments, a CBC system may include a heat source configured to heat a working gas, a turbine system to receive the working gas from the heat source, and a recuperator to receive the working gas from the turbine system and to cool the working gas. The heat source may be external to the recuperator in the sense that the heat source may be located outside the bounds of the recuperator. For example, such a configuration may be in contrast to a heat source that is inside a central region of a wrap-around recuperator.

The CBC system may also include a thermal radiator, or gas cooler, to receive the working gas from the recuperator and to further cool the working gas. The CBC system also includes a compressor to receive the working gas from the thermal radiator and to direct the working gas into the recuperator. A turbine-compressor shaft inside the recuperator may interconnect the compressor and a turbine of the turbine system. The CBC system may also include return channels to return the working gas to the heat source from the recuperator. In some implementations, the heat source may be a nuclear reactor.

The turbine system may include the turbine, an intake cavity to receive the working gas from the heat source, turbine nozzles to direct the working gas from the intake cavity to the turbine, an exit cavity to receive the working gas from the turbine, and guide vanes to direct the working gas from the exit cavity to the recuperator. The turbine system may be a relatively intricate configuration that may, at least in part, be 3D-printed in some implementations. The shape of the intake cavity may be a volume of revolution having an open axial center in line with the turbine-compressor shaft. The turbine nozzles and the guide vanes may be distributed around a volume of revolution also having an open axial center in line with the turbine-compressor shaft. The turbine nozzles and the guide vanes may be substantially parallel to one another and configured in a spiral shape. The turbine may be centered at the open axial center and connected to the turbine-compressor shaft.

For generating electricity, the CBC system may include an alternator (e.g., a generator) that is mechanically powered (e.g., via torque on a rotor of the alternator) by the turbine-compressor shaft. The electricity may be transmitted to a power management and distribution (PMAD) system, for example.

The CBC system may include an input plenum inside the recuperator to receive the working gas from the compressor and to distribute the working gas into the recuperator. The CBC system may also include an output plenum inside the recuperator to collect the working gas from the recuperator and to direct the working gas into the return channels.

In some embodiments, a power generating system may include a recuperator having a hot end and a cold end, a turbine on the hot end, a compressor on the cold end, a shaft extending from the hot end to the cold end and interconnecting the turbine and the compressor, and a heat source that is external to the recuperator. The turbine may be connected to the shaft's distal end, which does not extend substantially (e.g., less than a few centimeters) beyond the recuperator. The turbine may be a part of a turbine system that is directly attached to the hot end of the recuperator. Such a turbine system may include the turbine, an intake cavity to receive a working gas from the heat source, turbine nozzles to direct the working gas from the intake cavity to the turbine, an exit cavity to receive the working gas from the turbine, and guide vanes to direct the working gas from the exit cavity to the hot end of the recuperator. The turbine system and the compressor may be contiguous with the recuperator such that exterior manifolding need not be used between the turbine system and the recuperator.

Even though terms such as "hot" and "cold" are used herein, it is likely that most or all portions of the system loop are at elevated temperatures during operation and the terms "hot" and "cold" are merely relative terms.

In some implementations, which are described in detail below, the shape of the intake cavity may be a first volume of revolution having an open axial center in line with the shaft. The turbine nozzles and the guide vanes may be distributed around a second volume of revolution having the same open axial center. The turbine nozzles and the guide vanes may be substantially parallel to one another and configured in a spiral shape. The turbine may be centered at the open axial center and connected to the shaft. Also, the shaft may be connected to the compressor near the end of the shaft opposite the turbine end. An alternator that is external to the recuperator may be connected to a distal end of the shaft opposite the turbine end. For example, in this arrangement, the compressor is between the alternator and the turbine. As the shaft rotates from torque applied by the spinning turbine, the compressor and a rotor of the alternator also rotate and are thus mechanically powered by the shaft.

The power generating system may further comprise a gas cooler to i) cool a working gas exiting the cold end of the recuperator and ii) provide the cooled working gas to the compressor at a return port on the cold end of the recuperator. The gas cooler, the recuperator, the turbine, the compressor, and the heat source may comprise at least a portion of a closed Brayton cycle loop. In some implementations the heat source is a nuclear reactor, though claimed subject matter is not limited in this respect.

FIG. 1 is a flow diagram of a CBC system 100, according to some embodiments. System 100 may include a heat source 102 configured to heat a working gas, a turbine 104 to receive the working gas from the heat source, and a recuperator 106 to receive the working gas from the turbine. The working gas, which may be supercritical CO2 or a mixture of helium and xenon gas, for example, may flow through the closed Brayton cycle and be cooled as it flows through the recuperator. The cooled working gas may be further cooled by a gas cooler 108, which may be a thermal radiator. A compressor 110 may receive the working gas from the gas cooler, compress the working gas, and provide the higher pressure working gas into recuperator 106. As it traverses the recuperator, the higher pressure working gas is heated by the hotter working gas that is traversing in an opposite direction from turbine 104. System 100 may also include return channels that direct the higher pressure working gas back to heat source 102 from the recuperator, as indicated by an arrow 111. A portion of a shaft 112 that is inside the recuperator may interconnect turbine 104 and compressor 110. The shaft, which is configured to rotate as indicated by arrows 114, may extend beyond the compressor to an alternator 116.

In general terms, a recuperator, such as 106, is a type of heat exchanger having separate flow paths for the working gas to be cooled in one path while the working gas in the other path is heated, wherein heat is transferred through partitions separating the two paths. In some embodiments, such a heat exchange system may include a cylindrical shell that is configured to contain the working gas, for example. Opposing flows of the working gas exchange heat with each other as they pass through the recuperator via a series of midplates and microtubes inside the shell, for example. Thus, in this case, for example, heat from the working gas exiting turbine 104 may be transferred, via recuperator 106, to the working gas exiting compressor 110. Note that other recuperator configurations are possible such that a recuperator need not comprise midplates or microtubes inside a shell. Claimed subject matter is not limited in this respect.

Figure 2:
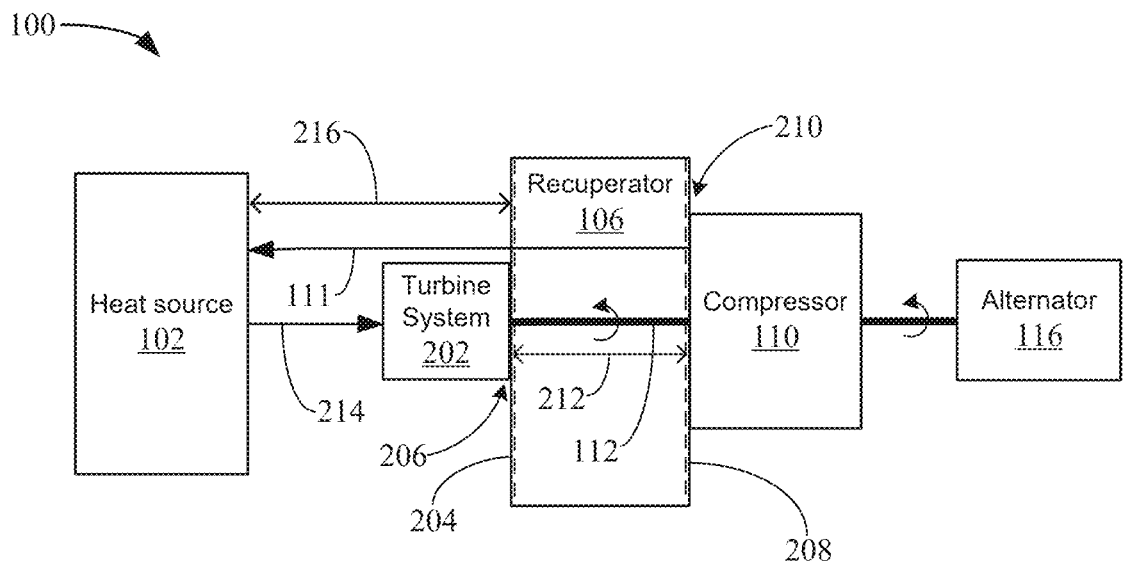
FIG. 2 is a flow diagram of a closed loop Brayton cycle system and illustrates some physical aspects of the system, according to some embodiments.

FIG. 2 is a flow diagram of CBC system 100 and illustrates some physical aspects of the system, according to some embodiments. Some parts of system 100 illustrated in FIG. 1, such as gas cooler 108, are not included in FIG. 2 for sake of clarity. System 100 may include a turbine system 202 that includes turbine 104. In these embodiments, turbine system 202 may be directly connected to recuperator 106 so that they are contiguous with each other. For example, the turbine system may be directly (e.g., no exterior manifolding therebetween) in contact and attached to a hot side 204 of the recuperator, as indicated by an arrow 206. Similarly, compressor 110 may be directly (e.g., no exterior manifolding therebetween) in contact and attached to a cold side 208 of the recuperator, as indicated by an arrow 210. In this way, the compressor and the recuperator may be contiguous with each other.

A portion 212 of shaft 112 that interconnects compressor 110 and turbine 104 of turbine system 202 need not extend beyond the bounds of the turbine-recuperator-compressor contiguity. In other words, the close arrangement among the turbine, the recuperator, and the compressor may encompass portion 212 of shaft 112. In contrast, a turbine that is connected to a recuperator via a manifold or other working gas-carrying piping may likely involve a shaft that extends beyond the recuperator. For example, such a turbine is physically separated from the recuperator so that the shaft is outside of the recuperator to reach the outlying turbine.

As described above, heat source 102 provides a heated working gas to turbine 104 in turbine system 202. The heated working gas travels from the heat source to the turbine system via manifolding 214 (e.g., tubing, conduit, piping, channels) that extends between the heat source and the turbine system. Heat source 102 may be external to the turbine-recuperator-compressor contiguity and may be a distance 216 from recuperator 106. For example, distance 216 between the heat source and the recuperator may be substantially greater than the distance between turbine 104 in turbine system 202 and the recuperator.

The portion 212 of shaft 112 that is inside recuperator 106 may, in addition to interconnecting turbine 104 and compressor 110, extend beyond the compressor to alternator 116, which may generate electricity for a PMAD system, for example.

As described above, compressor 110 may receive the working gas from gas cooler 108, compress the working gas, and provide the higher pressure working gas back into recuperator 106. As it traverses the recuperator, the higher pressure working gas is heated by the hotter working gas that is traversing in an opposite direction from turbine 104 of turbine system 202. Return channels that direct this higher pressure working gas back to heat source 102 from the recuperator are indicated by arrow 111.

Figure 3:
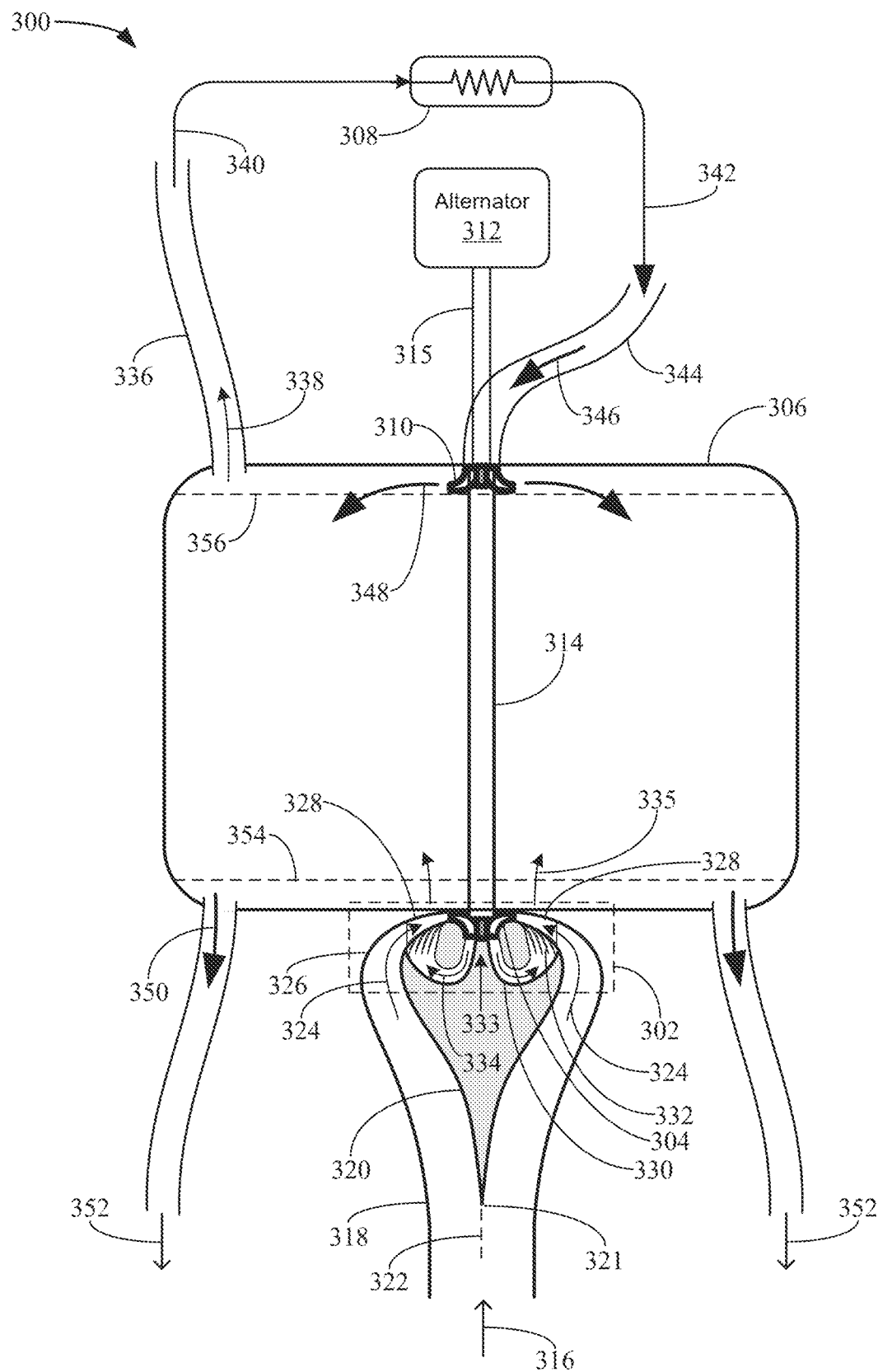
FIG. 3 is a schematic cross-section view illustrating a closed loop Brayton cycle system, according to some embodiments.

FIG. 3 is a schematic cross-section view illustrating a CBC system 300, according to some embodiments. System 300 includes, among other things, a heat source (not illustrated), a turbine system 302 that includes a turbine 304, a recuperator 306, a gas cooler 308, a compressor 310, and an alternator 312. A shaft 314 inside recuperator 306 connects turbine 304 with compressor 310. A portion of shaft 314, or a shaft extension 315, may interconnect the compressor and a rotor of the alternator.

Heated working gas from the heat source may enter, as indicated by an arrow 316, an entrance manifold 318. In some implementations, the interior of the entrance manifold leads to an inverted teardrop-shaped solid of revolution herein called a radial distribution cone 320. Entrance manifold 318 forms a volume of revolution around a lower portion (that includes a vertex 321) of radial distribution cone 320 so that the working gas divides at a center 322 of its flow and resultantly flows in the volume of revolution along the outside surface of the radial distribution cone. This flow is indicated by arrows 324. The latter part of this flow is within bounds of turbine system 302, which includes turbine 304, intake cavity 326 to receive the working gas from flow 324, turbine nozzles 328 to direct the working gas from the intake cavity to the turbine, an exit cavity 330 to receive the working gas from the turbine, and guide vanes 332 to direct the working gas from the exit cavity to the recuperator. The shape of intake cavity 326 may be a volume of revolution having an open axial center 333 in line with the turbine-compressor shaft. Turbine nozzles 328 and guide vanes 332 may be distributed around a volume of revolution also having open axial center 333. Arrows 334 indicate the flow of working gas inside exit cavity 330. The configuration of turbine system 302 is also described below.

Working gas exiting turbine 304 via guide vanes 332 is indicated by arrows 335. This flow of the working gas enters recuperator 306, traverses the recuperator, and exits the recuperator via a channel 336, as indicated by an arrow 338. This flow of the working gas may lead to gas cooler 308, as indicated by arrow 340. After exiting the gas cooler, the working gas is directed, as indicated by arrow 342, into a channel 344 to direct flow, as indicated by arrow 346, to compressor 310. The compressor may pressurize the working gas and distribute the flow, as indicated by arrows 348, back into recuperator 306. After traversing the recuperator, the working gas may exit the recuperator, as indicated by arrows 350 and return to the heat source, as indicated by arrows 352. Note that, in FIG. 3, relatively small arrowheads are used to indicate flow of hotter working gas and relatively large arrowheads are used to indicate flow of colder working gas.

In some implementations, flow 335 of working gas exiting turbine 304 via guide vanes 332 may enter recuperator 306 via a hot side plenum 354. For example, plenum 354 may receive flow 335 and distribute the working gas into flow channels (e.g., microtubes) distributed throughout recuperator 306. In a similar fashion, flow 348 of working gas exiting compressor 310 may enter recuperator 306 via a cold side plenum 356. For example, plenum 356 may receive flow 348 and distribute the working gas into flow channels distributed throughout recuperator 306. As indicated above, claimed subject matter is not limited to any particular recuperator configuration.

As discussed above, while traversing recuperator 306, working gas from turbine 304 exchanges heat with working gas from compressor 310. In particular, working gas from turbine 304 is cooled as it loses heat to working gas from compressor 310. Resultantly, the working gas from the compressor is heated before it reenters the heat source.

Figure 4:
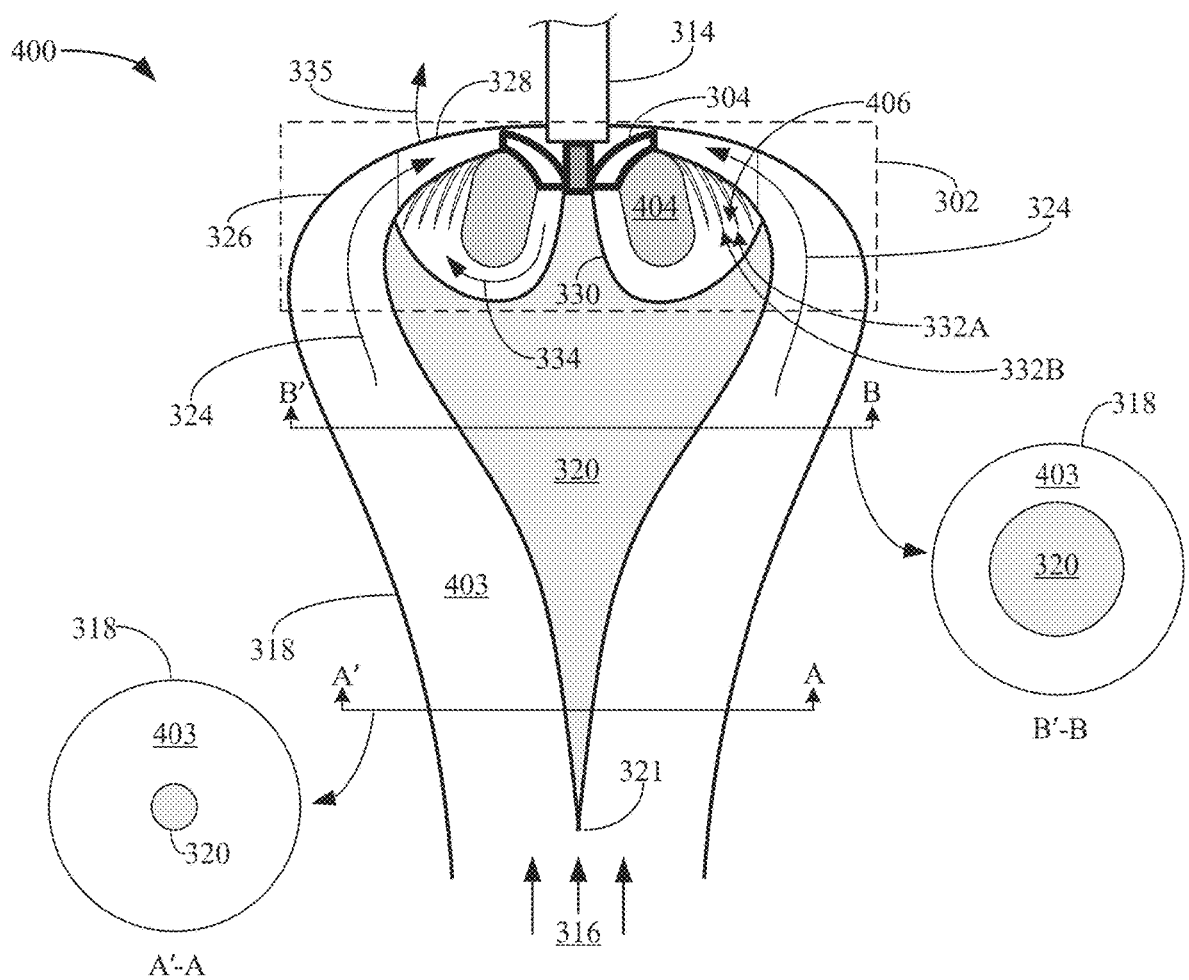
FIG. 4 is a schematic cross-section close-up view illustrating a portion of a closed loop Brayton cycle system that includes a turbine system, according to some embodiments.

FIG. 4 is a schematic cross-section close-up view illustrating a portion 400 of a CBC system that includes turbine system 302, according to some embodiments. As explained above, heated working gas from a heat source may enter, as indicated by an arrows 316, an entrance manifold 318. In some implementations, working gas flow in the interior of the entrance manifold encounters radial distribution cone 320. In other words, working gas from the heat source in entrance manifold 318 flows toward the radial distribution cone. Entrance manifold 318 forms a volume of revolution around a lower portion of radial distribution cone 320, which includes vertex 321, so that the flow of the working gas divides at the vertex (e.g., center 322 or the axis of the radial distribution cone) and resultantly flows in an interior volume 403, which is the inside of entrance manifold 318 but exterior to the radial distribution cone. This flow in 403 is indicated by arrows 324. An inset of FIG. 4 is a cross section A'-A that illustrates a lower part of radial distribution cone 320 inside entrance manifold 318. In this cross section, working fluid flows "out of the page" in entrance manifold 318. Another inset of FIG. 4 is a cross section B'-B that illustrates an upper part of radial distribution cone 320 inside entrance manifold 318. In this cross section, working fluid flows "out of the page" and slightly outward from center due to the curvature of radial distribution cone 320 and entrance manifold 318.

As the working gas flows upward between the inside surface of the entrance manifold and the radial distribution cone, the flow enters into turbine system 302. As mentioned above, turbine system 302 includes turbine 304, intake cavities 326 to receive the working gas from flow 324, turbine nozzles 328 to direct the working gas from the intake cavity to the turbine, exit cavity 330 to receive the working gas from the turbine, and guide vanes 332 to direct the working gas from the exit cavity to the recuperator. Arrows 334 indicate the flow of working gas inside exit cavity 330. A solid of revolution 404 about a central axis (that is in line with shaft 314) forms, in part, the shape of the exit cavity. Two of the guide vanes are identified as 332A and 332B. These and multiple other guide vanes are distributed circumferentially around exit cavity 330. For example, adjacent guide vanes (e.g., 332A and 332B) are separated by a turbine nozzle 406, and this arrangement repeats circumferentially around exit cavity 330. Turbine nozzle 406 is generally the same as 328. The difference in appearance is because 328 is illustrated in a cutaway view and 406 is illustrated in a view from underneath, inside exit cavity 330.

Working gas exiting turbine 304 via guide vanes 332 is indicated by arrow 335. This flow of the working gas enters recuperator 306, as described above.

Figure 5:
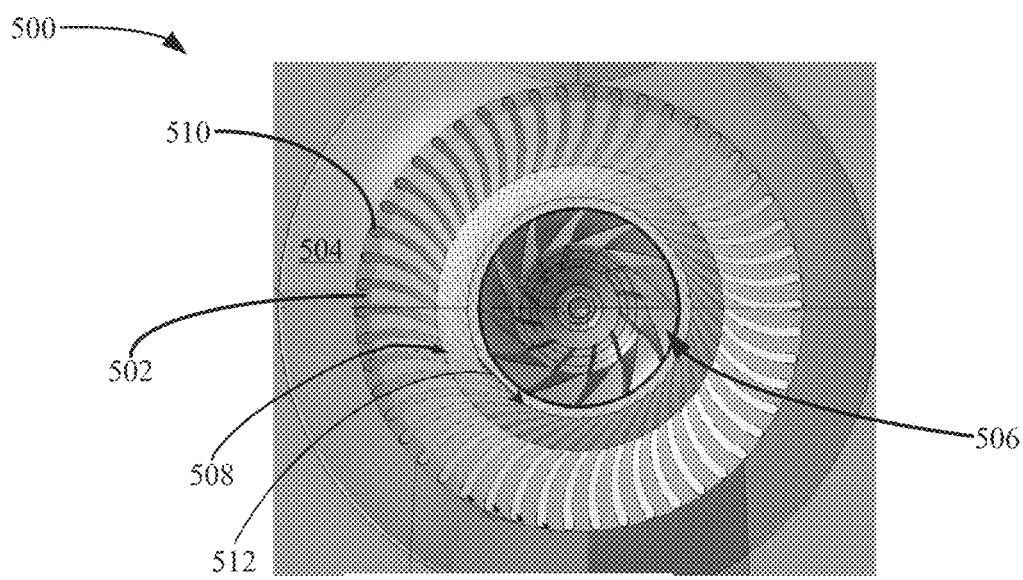
FIG. 5 is a schematic cross-section axial view illustrating a turbine system of a closed loop Brayton cycle system, according to some embodiments.

FIG. 5 is a schematic cross-section axial view illustrating a turbine system 500 of a CBC system, according to some embodiments. For example, turbine system 500 may be the same as or similar to 302. If FIGS. 3 and 4 are side views, then FIG. 5 is a top view downward. Turbine nozzles 502 (e.g., 328) may be configured to direct the working gas from intake cavity 504 (e.g., 326) to a turbine 506. Arrow 508 indicates the flow of working gas along one of turbine nozzles 502. Guide vanes 510 (e.g., 332) may be configured to direct the working gas from an exit cavity, such as 330, below the turbine, to a recuperator.

Turbine nozzles 502 and guide vanes 510 may be substantially parallel to one another, as illustrated, and configured in a spiral shape, which results in the termini of the turbine nozzles being aimed with a circumferential component, as indicated by arrow 512, for example, so that working gas is applied to the turbine at a favorable angle.

Figure 6:
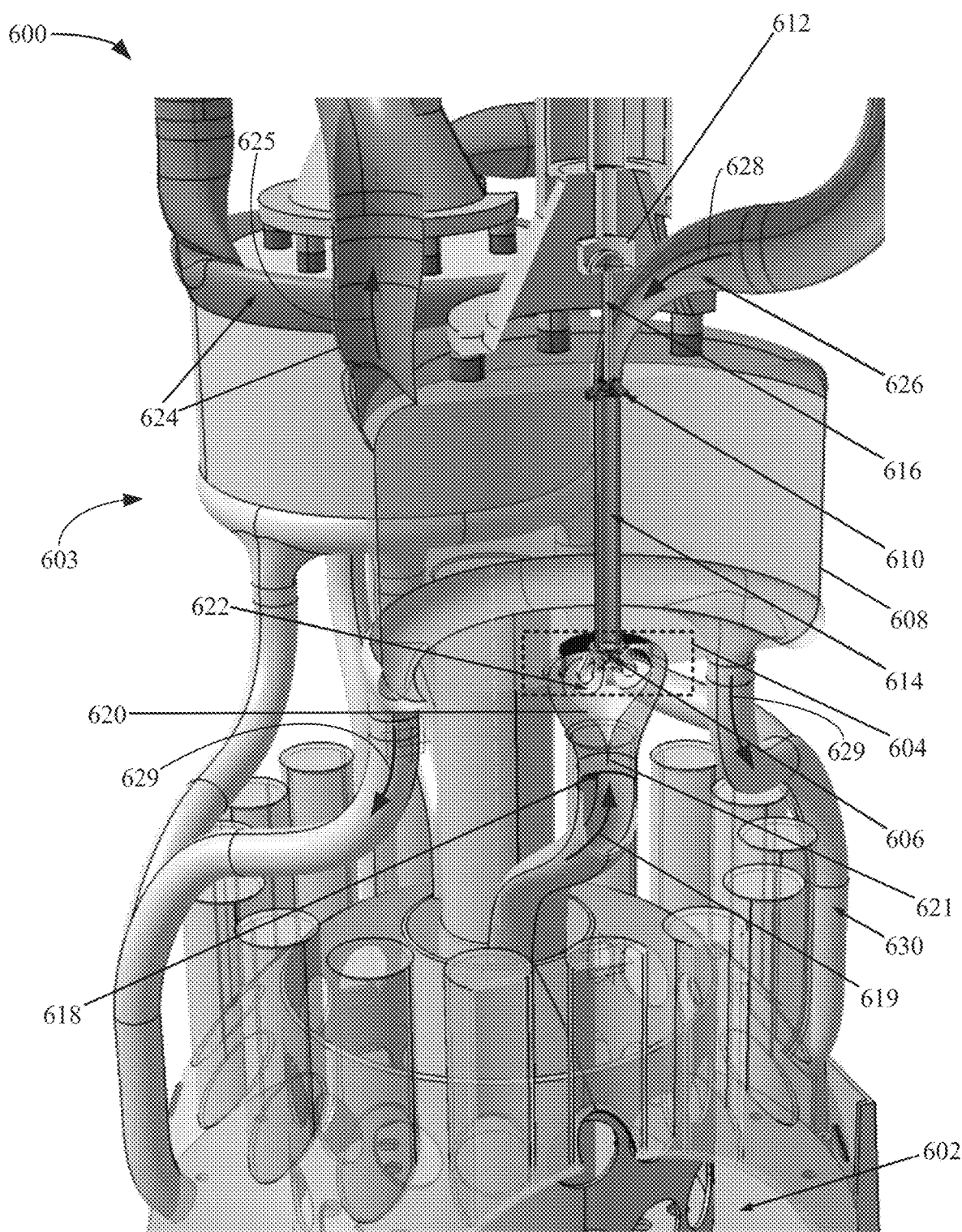
FIG. 6 is a perspective cutaway view illustrating a portion of a closed loop Brayton cycle system and nuclear reactor, according to some embodiments.

FIG. 6 is a perspective cutaway view illustrating a portion of a CBC system 600 and a portion of a nuclear reactor 602, according to some embodiments. For example, nuclear reactor 602 may be the heat source for CBC system 600, which may be the same as or similar to system 300. FIG. 6 also illustrates a second CBC system 603. System 600 is illustrated in a cutaway view while system 603 is illustrated as an exterior view.

System 600 includes, among other things, the nuclear reactor, a turbine system 604 that includes a turbine 606, a recuperator 608, a gas cooler (not illustrated), a compressor 610, and an alternator 612. A shaft 614 inside recuperator 608 connects turbine 606 with compressor 610. A portion of shaft 614, or a shaft extension 616, may interconnect the compressor and a rotor of the alternator.

Heated working gas from the heat source may enter an entrance manifold 618, as indicated by arrow 619. In some implementations, the interior of the entrance manifold leads to a radial distribution cone 620. Entrance manifold 618 forms a volume of revolution around a lower portion (that includes a vertex 621) of radial distribution cone 620 so that the working gas divides at a center of its flow and resultantly flows in the volume of revolution along the outside surface of the radial distribution cone. Intake cavities (e.g., 326) receive the working gas and direct the flow to turbine nozzles that direct the working gas from the intake cavity to turbine 606. An exit cavity 622 receives the working gas from the turbine, and guide vanes (e.g., 332) direct the working gas from exit cavity 622 to recuperator 608.

Working gas exits the recuperator via a channel 624, as indicated by arrow 625. This flow of the working gas may lead to gas cooler (e.g., 308). After exiting the gas cooler, the working gas is directed into a channel 626 to direct flow, as indicated by arrow 628, to compressor 610. The compressor may pressurize the working gas and distributed the flow back into recuperator 608. After traversing the recuperator, the working gas may exit the recuperator, as indicated by arrows 629, and return to the heat source via channels 630.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. A power generating system comprising:
   a recuperator having a hot end and a cold end;
   a turbine directly mounted to the hot end of the recuperator;
   a compressor directly mounted to the cold end of the recuperator;
   a shaft disposed within the recuperator and extending from the hot end to the cold end of the recuperator and interconnecting the turbine and the compressor; and
   a heat source that is external to the recuperator,
   wherein the turbine, the recuperator, and the compressor are mechanically contiguous to permit direct gas flow between the turbine and the recuperator without exterior manifolding and to permit direct gas flow between the compressor and the recuperator without exterior manifolding.

2. The power generating system of claim 1, wherein the turbine is connected to a distal end of the shaft and the distal end of the shaft does not extend beyond the recuperator.

3. The power generating system of claim 1, wherein the turbine is a part of a turbine system that is directly attached to the hot end of the recuperator and includes:
   an intake cavity configured to receive a working gas from the heat source;
   turbine nozzles configured to direct the working gas from the intake cavity to the turbine;
   an exit cavity configured to receive the working gas from the turbine; and
   guide vanes configured to direct the working gas from the exit cavity to the hot end of the recuperator.

4. The power generating system of claim 3, wherein the turbine system and the compressor are contiguous with the recuperator.

5. The power generating system of claim 3, wherein
   the shape of the intake cavity is a first volume of revolution having an open axial center in line with the shaft,
   the turbine nozzles and the guide vanes are distributed around a second volume of revolution having the open axial center,
   the turbine nozzles and the guide vanes are substantially parallel to one another and configured in a spiral shape, and
   the turbine is centered at the open axial center.

6. The power generating system of claim 1, further comprising an alternator or a generator that is external to the recuperator and is mechanically powered by the shaft.

7. The power generating system of claim 1, further comprising a gas cooler to i) cool a working gas exiting the cold end of the recuperator and ii) provide the cooled working gas to the compressor at a return port on the cold end of the recuperator, wherein the gas cooler, the recuperator, the turbine, the compressor, and the heat source comprise a portion of a Brayton cycle loop.

8. The power generating system of claim 1, wherein the heat source is a nuclear reactor.

9. A closed Brayton cycle comprising:
   a heat source configured to heat a working gas;
   a turbine system configured to receive the working gas from the heat source;
   a recuperator having a hot end and a cold end, the recuperator configured to receive the working gas from the turbine system at the hot end and to cool the working gas;
   a thermal radiator configured to receive the working gas from the recuperator and to cool the working gas;
   a compressor directly mounted to the cold end of the recuperator and configured to receive the working gas from the thermal radiator and to provide the working gas into the recuperator;
   a turbine-compressor shaft disposed inside the recuperator and interconnecting a turbine of the turbine system and the compressor; and
   return channels configured to return the working gas to the heat source from the recuperator, wherein the turbine system is directly mounted to the hot end of the recuperator such that the turbine system, recuperator, and compressor are mechanically contiguous and do not include exterior manifolding between the turbine and the recuperator and further do not include exterior manifolding between the compressor and the recuperator, and wherein a distal end of the turbine-compressor shaft connected to the turbine does not extend outside the recuperator.

10. The closed Brayton cycle of claim 9, wherein the turbine system includes:
   an intake cavity configured to receive the working gas from the heat source;
   turbine nozzles configured to direct the working gas from the intake cavity to the turbine;
   an exit cavity configured to receive the working gas from the turbine; and
   guide vanes configured to direct the working gas from the exit cavity to the recuperator.

11. The closed Brayton cycle of claim 10, wherein the shape of the intake cavity is a volume of revolution having an open axial center in line with the turbine-compressor shaft.

12. The closed Brayton cycle of claim 10, wherein the turbine nozzles and the guide vanes are distributed around a volume of revolution having an open axial center in line with the turbine-compressor shaft.

13. The closed Brayton cycle of claim 10, wherein the turbine nozzles and the guide vanes are substantially parallel to one another and configured in a spiral shape.

14. The closed Brayton cycle of claim 12, wherein the turbine is centered at the open axial center.

15. The closed Brayton cycle of claim 9, further comprising an alternator or a generator that is mechanically powered by the turbine-compressor shaft.

16. The closed Brayton cycle of claim 9, further comprising an input plenum inside the recuperator to receive the working gas from the compressor and to distribute the working gas into the recuperator.

17. The closed Brayton cycle of claim 9, further comprising an output plenum inside the recuperator to collect the working gas from the recuperator and to direct the working gas into the return channels.

18. The closed Brayton cycle of claim 9, wherein the heat source is a nuclear reactor.

* * * * *